(12) United States Patent
Schmatloch et al.

(10) Patent No.: US 10,428,251 B2
(45) Date of Patent: Oct. 1, 2019

(54) TWO-PART POLYURETHANE ADHESIVES MADE USING ISOCYANATE-TERMINATED QUASI-PREPOLYMERS BASED ON POLY(BUTYLENE OXIDE)

(71) Applicant: Dow Global Technologies LLC, Midland, MI (US)

(72) Inventors: Stefan Schmatloch, Thalwail (CH); Ilona Caderas, Goldingen (CH)

(73) Assignee: Dow Global Technologies LLC, Midland, MI (US)

( * ) Notice: Subject to any disclaimer, the term of this patent is extended or adjusted under 35 U.S.C. 154(b) by 175 days.

(21) Appl. No.: 15/735,175

(22) PCT Filed: Jun. 2, 2016

(86) PCT No.: PCT/US2016/035564
§ 371 (c)(1),
(2) Date: Dec. 9, 2017

(87) PCT Pub. No.: WO2016/204978
PCT Pub. Date: Dec. 22, 2016

(65) Prior Publication Data
US 2018/0155590 A1 Jun. 7, 2018

Related U.S. Application Data

(60) Provisional application No. 62/181,369, filed on Jun. 18, 2015.

(51) Int. Cl.
| | | |
|---|---|---|
| C09J 175/08 | (2006.01) | |
| C09J 175/04 | (2006.01) | |
| C08G 18/48 | (2006.01) | |
| C08G 18/66 | (2006.01) | |
| C08G 18/72 | (2006.01) | |
| C08G 18/16 | (2006.01) | |
| C09J 175/12 | (2006.01) | |
| C08G 18/32 | (2006.01) | |
| C08K 3/34 | (2006.01) | |
| C08G 18/10 | (2006.01) | |

(52) U.S. Cl.
CPC .......... *C09J 175/04* (2013.01); *C08G 18/165* (2013.01); *C08G 18/4854* (2013.01); *C08G 18/667* (2013.01); *C08G 18/724* (2013.01); *C08G 18/10* (2013.01); *C08G 18/3206* (2013.01); *C08G 18/3228* (2013.01); *C08G 18/4804* (2013.01); *C08G 18/485* (2013.01); *C08G 18/4825* (2013.01); *C08G 18/4829* (2013.01); *C08K 3/346* (2013.01); *C09J 175/08* (2013.01); *C09J 175/12* (2013.01)

(58) Field of Classification Search
None
See application file for complete search history.

(56) References Cited

U.S. PATENT DOCUMENTS

| | | | |
|---|---|---|---|
| 5,143,996 A * | 9/1992 | Chung | B32B 7/00 156/331.4 |
| 7,931,970 B2 | 4/2011 | Schlingloff | |
| 2009/0044907 A1 | 2/2009 | Tribelhorn | |
| 2018/0171059 A1* | 6/2018 | Schmatloch | C08G 18/244 |

FOREIGN PATENT DOCUMENTS

WO   WO2012/078331 A   6/2012

* cited by examiner

*Primary Examiner* — Richard A Huhn
(74) *Attorney, Agent, or Firm* — M. Robert Christy

(57) ABSTRACT

Two-component polyurethane adhesives include a polyol component and a polyisocyanate component. The polyol component includes a polyether polyol and an aliphatic diol chain extender. The polyisocyanate component includes an isocyanate prepolymer made by reacting an aromatic polyisocyanate with a poly(butylene oxide) polyol. When cured, the adhesive is highly resistant to heat and humidity, and exhibits an unexpectedly high modulus and tensile strength.

7 Claims, No Drawings

TWO-PART POLYURETHANE ADHESIVES MADE USING ISOCYANATE-TERMINATED QUASI-PREPOLYMERS BASED ON POLY(BUTYLENE OXIDE)

This invention relates to two-part polyurethane adhesives.

Polyurethanes are a well-known type of adhesive. They are made from precursors that cure to form an adhesive layer. During the curing reaction, the adhesive forms a strong adhesive bond to many types of substrates.

In some applications, the bonded substrate is exposed over its useful life to a wide range of temperature and/or moisture conditions, particularly if used outdoors or in other environments that lack temperature and humidity control. Automobiles, for example, are operated over changing seasonal conditions during which they are exposed to wet and dry conditions and a wide range of temperatures. Many parts are exposed to engine heat when the vehicle is operated, and so experience frequent and rapid changes in temperature and humidity. Adhesives used in these applications need to retain good properties across the range of temperatures, and in wet or humid conditions.

Unfortunately, many polyurethane adhesives are sensitive to the presence of water, and lose desirable properties when exposed to liquid water and/or humid conditions. The combination of elevated temperature and moisture can be especially troublesome. Under these conditions, it is not unusual for a polyurethane adhesive to experience a loss in modulus, together with a significant increase in elongation. These property changes can have an adverse effect on the performance of the bonded structure.

What is desired is to provide a polyurethane adhesive that has better resistance (as indicated by a smaller change in properties) to warm and humid conditions and which otherwise has good curing, adhesive and physical properties.

This invention is in one aspect a two-component polyurethane adhesive composition having a polyol component and a polyisocyanate component, wherein:

the polyol component includes:

a) at least 35 weight percent, based on the weight of the polyol component, of one or more polyether polyols having a hydroxyl equivalent weight of 400 to 2000 and a nominal hydroxyl functionality of 2 to 4, which polyether polyols(s) are selected from homopolymers of propylene oxide and copolymers of 70 to 99% by weight propylene oxide and correspondingly 1 to 30% by weight ethylene oxide;

b) 5 to 20 parts by weight, per 100 parts by weight of ingredient a) of the polyol component, of one or more diol chain extenders;

c) 0.1 to 3 parts by weight, per 100 parts by weight of ingredient a) of the polyol component, of at least one compound having at least two primary and/or secondary aliphatic amine groups;

d) a catalytically effective amount of at least one urethane catalyst; and e) up to 60 weight percent, based on the weight of the polyol component, of at least one particulate filler;

and the polyisocyanate component includes:

15 to 60 weight percent, based on the weight of the polyisocyanate component, of at least one isocyanate-terminated poly(butylene oxide) prepolymer having at least 2 isocyanate groups per molecule, an isocyanate equivalent weight of 700 to 3500 and a poly(butylene oxide) segment having a weight of 1000 to 6000 g/mol;

20 to 55 weight percent, based on the weight of the polyisocyanate component, of at least one polyisocyanate compound having an isocyanate equivalent weight of up to 350 and 2 to 4 isocyanate groups per molecule; and up to 50% by weight of at least one particulate inorganic filler;

wherein the isocyanate equivalent weight of the polyisocyanate component and the equivalent weight per isocyanate-reactive group of the polyol component are such that when the polyisocyanate component and the polyol component are mixed at a 1:1 ratio by volume the isocyanate index is 1.1 to 1.8.

The invention is also a cured adhesive formed by curing the two-component polyurethane adhesive composition of the invention. The invention is also a method of bonding two substrates, comprising forming a layer of the two-component polyurethane adhesive at a bondline between two substrates, and curing the layer at the bondline to form a cured adhesive bonded to each of the substrates.

The cured adhesive exhibits a marked resistance to conditions of heat and humidity, as indicated by at most small changes in modulus and elongation when tested before and after humid aging in the test described in the examples that follow. The cured adhesive also exhibits a surprisingly high modulus and tensile strength.

Ingredient a) of the polyol component is a polyether polyol or mixture of polyether polyols. The polyether polyol or polyols have a hydroxyl equivalent weight of 400 to 2000. The hydroxyl equivalent weight in some embodiments is at least 500, at least 800 or at least 1000, and in some embodiments is up to 1800, up to 1500 or up to 1200.

The polyether polyol or polyols have a nominal hydroxyl functionality of 2 to 4. By "nominal functionality" of a polyether polyol, it is meant the average number of oxyalkylatable hydrogen atoms on the initiator compound that is alkoxylated to form the polyether polyol. The actual functionalities of the polyether polyol(s) may be somewhat lower than the nominal functional, due to side-reactions that occur during the alkoxylation process. In the case of a mixture of polyether polyols, the number average nominal functionality preferably is 2 to 3.5 and especially 2.5 to 3.5.

The polyether polyol(s) are selected from homopolymers of propylene oxide and copolymers of 70 to 99% by weight propylene oxide and 1 to 30% by weight ethylene oxide. The copolymers are generally preferred if a single polyether polyol is present. If two or more polyether polyols are present, it is preferred that at least one is a copolymer of propylene oxide and ethylene oxide. In the case of a copolymer, the propylene oxide and ethylene oxide may be randomly copolymerized or block copolymerized, or both.

In some embodiments, 50% or more of the primary hydroxyl groups of the polyether polyol(s) are primary hydroxyl (with the remainder being secondary hydroxyl groups). 70% or more of the hydroxyl groups may be primary hydroxyl.

The polyether polyol(s) (ingredient a)) constitutes at least 35 weight percent of the polyol component. In some embodiments, the polyether polyol(s) constitute at least 40 weight percent or at least 50 weight percent of the polyol component, and in some embodiments constitute up to 80 weight percent, up to 65 weight percent or up to 55 weight percent thereof.

Ingredient b) of the polyol component is one or more diol chain extenders. The diol chain extender(s) have a hydroxyl equivalent weight of up to 200, preferably up to 100, more preferably up to 75 and still more preferably up to 60, and exactly two hydroxyl groups per molecule. The diol chain extenders preferably are aliphatic diols such as monoethylene glycol, diethylene glycol, 1,2-propane diol, 1,3-propane diol, 2,3-dimethyl-1,3-propanediol, dipropylene glycol, 1,4-butanediol, 1,6-hexanediol and other linear or branched alkylene diols having up to about 20 carbon atoms. Preferred diol chain extenders are monoethylene glycol, 1,2-propane diol and 1,4-butanediol, or mixtures of two or more of these. The chain extender is present in an amount of 5 to 20 parts by weight per 100 parts by weight of ingredient a). In some embodiments, it is present in an amount of 7 to 15 parts, or 8 to 12 parts, per 100 parts by weight of ingredient a).

Ingredient c) of the polyol component is at least one compound having two or more primary and/or secondary aliphatic amine groups. Such compounds preferably have a molecular weight of at least 60, preferably at least 100, up to 1000, more preferably up to about 750 and still more preferably up to 500. Such compounds may have 2 to 4, more preferably 2 to 3, primary and/or second aliphatic amine groups and 2 to 8, more preferably 3 to 6, hydrogens bonded to aliphatic nitrogen atoms. Examples of ingredient c) materials include ethylene diamine; 1,3-propanediamine; 1,2-propane diamine; polyalkylene polyamines such as diethylene triamine and triethylene tetraamine; isophorone diisocyanate, cyclohexane diamine; bis(amino-methyl)cyclohexane; and aminated polyethers such as those sold as Jeffamine™ D-400 and T-403 by Huntsman Corporation. The ingredient c) material provides a rapid initial thickening when the polyol and polyisocyanate components are first mixed, but is present in only a small amount so open time remains long enough that the adhesive can be mixed and applied in an industrial setting. The ingredient c) material therefore is present in an amount of 0.1 to 3 parts by weight per 100 parts by weight of ingredient a), and in some embodiments 0.25 to 2 parts by weight or 0.5 to 1.5 parts by weight on the same basis.

The polyol component further contains ingredient d), a catalytically effective amount of at least one urethane catalyst. A "urethane catalyst" for purposes of this invention is a material that catalyzes the reaction of a hydroxyl group with an isocyanate group. Suitable catalysts include, for example, include tertiary amines, cyclic amidines, tertiary phosphines, various metal chelates, acid metal salts, strong bases, various metal alcoholates and phenolates and metal salts of organic acids.

The catalyst may be or include one or more tin catalysts such as stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, dialkyltinthioglycolates, and the like. Dialkyl tin mercaptides such as dioctyltinmercaptide and dibutyltin mercaptide are a preferred type of tin catalyst.

Examples of other metal-containing catalysts are bismuth, cobalt and zinc salts.

Examples of tertiary amine catalysts include: trimethylamine, triethylamine, N-methylmorpholine, N-ethylmorpholine, N,N-dimethylbenzylamine, N,N-dimethyl-ethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Useful amidine catalysts include 1,8-diazabicyclo[5.4.0]-undec-7-ene.

The catalyst(s) are used in catalytically effective amounts, for example, each catalyst being employed from about 0.0015 to about 5% by weight of polyether polyol(s) (ingredient a) of the polyol component. Tin catalysts are generally used in very small amounts, such as from 0.0015 to 0.25 weight-%.

The polyol component may further include one or more optional components.

The polyol component may contain at least one particulate filler; however, if a filler is present, it constitutes no more than 60 weight percent of the total weight of the polyol component. It preferably constitutes 25 to 60, more preferably 30 to 50 weight percent of the polyol component. The particulate filler is in the form of particles having a longest dimension of 50 nm to 100 µm. The fillers may have a longest dimension of at least 250 nm, at least 500 nm or at least 1 µm, up to, for example, 50 µm, 25 µm or 10 µm.

The particulate filler is a material that is solid at room temperature, is not soluble in the other ingredients of the polyol component or in the polyisocyanate component or any ingredient thereof. The filler is a material that does not melt, volatilize or degrade under the conditions of the curing reaction between the polyol and polyisocyanate components. The filler may be, for example, an inorganic filler such as glass, silica, boron oxide, boron nitride, titanium oxide, titanium nitride, fly ash, calcium carbonate, various alumina-silicates including clays such as wollastonite and kaolin, a metal particles such as iron, titanium, aluminum, copper, brass, bronze and the like; thermoset polymer particles such as polyurethane, cured epoxy resin, phenol-formaldehyde, cresol-formaldehyde, crosslinked polystyrene and the like; thermoplastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like. In some embodiments, the particulate filler excludes carbon particles. The particles in some embodiments have an aspect ratio of up to 5, preferably up to 2, more preferably up to 1.5.

Some or all of the filler particles can be grafted onto one or more of the polyether polyol(s) that constitute ingredient (a) of the polyol component.

Another optional ingredient is one or more dispersing aids, which wet the surface of the filler particles and help to disperse them into the polyether polyol(s). These may also have the effect of reducing viscosity. Among these are, for example, various dispersing agents sold by BYK Chemie under the BYK, DISPERBYK and ANTI-TERRA-U tradenames, and fluorinated surfactants such as FC-4430, FC-4432 and FC-4434 from 3M Corporation. Such dispersing aids may constitute, for example, up to 2 weight percent, preferably up to 1 weight percent of the polyol component.

Another useful optional ingredient of the polyol component is a desiccant such as fumed silica, silica gel, aerogel, various zeolites and molecular sieves, and the like. These may constitute up to 5 weight percent, preferably up to 2 weight percent, of the polyol component, and may be absent therefrom.

The polyol component may further include one or more additional isocyanate-reactive compounds, different from ingredients a), b) and c) of the polyol component. If any such additional isocyanate-reactive compound(s) are present, they preferably constitute no more than 10 percent, more preferably no more than 5 percent and even more preferably no more than 2 percent, of the weight of the polyol component. Examples of such additional isocyanate-reactive compounds include, for example, one or more polyester polyols; one or more polyether polyols containing at least 50 weight percent polymerized ethylene oxide; one or more polyether polyols having a hydroxyl equivalent weight of 100 to 499; one or more aromatic amine compounds; and one or more crosslinkers having three or more isocyanate-reactive groups per molecular and a hydroxyl equivalent weight of up to 499.

The adhesive of the invention preferably is non-cellular, and for that reason, the polyol component preferably contains no more than 0.5% by weight, more preferably no more than 0.1% by weight of organic compounds having a boiling temperature of 80° C. or less, and no more than 0.1% by weight, more preferably no more than 0.05% by weight, of water and/or other chemical blowing agents that produce a gas under the conditions of the curing reaction.

The polyol component in some embodiments contains no more than 10 weight percent, more preferably no more than 5 weight percent, and even more preferably no more than 1 weight percent, of plasticizer such as a phthalate, terephthalate, mellitate, sebacate, maleate or other ester plasticizer, a sulfonamide plasticizer, a phosphate ester plasticizer, or a polyether di(carboxylate) plasticizer. The polyol component may be devoid of such a plasticizer.

The polyisocyanate component contains at least one isocyanate-terminated poly(butylene oxide) prepolymer having a poly(butylene oxide) segment. The prepolymer has at least 2 isocyanate groups per molecule. In some embodiments, it constitutes 20 to 60 percent, 20 to 50 percent or 25 to 35 percent of the weight of the polyisocyanate component.

The prepolymer is a reaction product of a poly(butylene oxide) polyol nominally having two or more, preferably 2 to 3 and more preferably exactly 2, terminal hydroxyl groups and one mole of a polyisocyanate per equivalent of the terminal hydroxyl groups. This reaction produces a prepolymer having a poly(butylene oxide) segment corresponding to the poly(butylene oxide) polyol after removal of the terminal hydroxyl groups, which prepolymer is capped with the polyisocyanate and so has terminal isocyanate groups. The poly(butylene oxide) polyol is a homopolymer of 1,2-butylene oxide and/or 2,3-butylene oxide or a copolymer of one or both of these with up to 10 mole-% of a copolymerizable alkylene oxide such as 1,2-propylene oxide. The poly(butylene oxide) polymer (and corresponding poly(butylene oxide) segment of the prepolymer) typically also contains the residue of a polymerization initiator that may constitute, for example, up to 15 percent of the total weight of the poly(butylene oxide) polyol.

The poly(butylene oxide) polyol and corresponding poly(butylene oxide) segment of the prepolymer has a weight of 1000 to 6000 g/mol, preferably 1500 to 5000 g/mol, more preferably 1800 to 4200 g/mol. The poly(butylene oxide) prepolymer has an isocyanate equivalent weight of 550 to 4000, preferably 700 to 3500, more preferably 700 to 3000 and even more preferably 1000 to 3000. The equivalent weight for purposes of this invention is calculated by adding the weight of the poly(butylene oxide) polyol used to prepared the prepolymer and the weight of polyisocyanate(s) consumed in reaction with the polyol, and dividing by the number of isocyanate groups in the resulting prepolymer.

The polyisocyanate used to make the prepolymer can be any of the polyisocyanate compounds mentioned below, or a mixture of two or more of these. The prepolymer has at least 2, preferably 2 to 4, especially 2 to 3, isocyanate groups per molecule. The isocyanate groups of the prepolymer may be aromatic, aliphatic (including alicyclic), or a mixture of aromatic and aliphatic isocyanate groups. The isocyanate groups on the prepolymer molecules preferably are aromatic.

The isocyanate component further contains 20 to 55 weight percent, based on the weight of the polyisocyanate component, of at least one polyisocyanate compound having an isocyanate equivalent weight of up to 350 and 2 to 4 isocyanate groups per molecule. Each such polyisocyanate compound may have, for example an average of 2 to 4 or 2.3 to 3.5 isocyanate groups per molecule. The isocyanate equivalent weight of this polyisocyanate compound in some embodiments is 80 to 250, 80 to 200, or 80 to 180.

At least a portion of the polyisocyanate compound has aromatic isocyanate groups. Among the useful aromatic polyisocyanate compounds m-phenylene diisocyanate, toluene-2,4-diisocyanate, toluene-2,6-diisocyanate, naphthylene-1,5-diisocyanate,), methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyl-diphenylmethane-2,2',5,5'-tetraisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI"), and so-called "liquid MDI" products that are mixtures of MDI and MDI derivatives that have biuret, carbodiimide, uretoneimine or allophonate linkages.

In some embodiments, at least a portion of the polyisocyanate compound is one or more aliphatic polyisocyanates. Examples of these include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate. Up to 100% of the polyisocyanate compounds may be one or more aliphatic polyisocyanates.

In some embodiments, at least some of the polyisocyanate groups present in the polyisocyanate component are aromatic isocyanate groups. It is preferred that the polyisocyanate compound having an isocyanate equivalent weight of up to 350 includes at least one aromatic polyisocyanate. In some embodiments, the polyisocyanate compound(s) having an isocyanate equivalent weight of up to 350 have only aromatic isocyanate groups. Up to 100% of the polyisocyanate compounds may be one or more aromatic polyisocyanates.

In other embodiments, polyisocyanate component contains both aliphatic and aromatic isocyanate groups. In such embodiments, the prepolymer may contain both aromatic and aliphatic isocyanate groups, but it preferably contains only aromatic isocyanate groups. In such embodiments, the polyisocyanate compound(s) having an isocyanate equivalent weight of up to 350 may be a mixture of one or more aromatic polyisocyanate compounds and one or more aliphatic polyisocyanate compounds.

If a mixture of aromatic and aliphatic isocyanate groups is present in the polyisocyanate component, it is preferred that at least 50% by number, more preferably at least 75% by number, are aromatic isocyanate groups. In some preferred embodiments, the 80 to 95% by number of the isocyanate groups are aromatic, and 5 to 20% by number are aliphatic. It is especially preferred that the isocyanate groups of the prepolymer are aromatic, and the isocyanate groups of the polyisocyanate compound(s) having an isocyanate equivalent weight of up to 350 are a mixture of 80 to 95% aromatic isocyanate groups and 5 to 20% aliphatic isocyanate groups.

The mixture of prepolymer and polyisocyanate compound having an isocyanate equivalent weight of up to 350 can be prepared by forming the prepolymer separately by reacting the poly(butylene oxide) polyol with enough of a polyisocyanate to cap the hydroxyl groups and introduce isocyanate groups, and then mixing the resulting prepolymer with additional polyisocyanate compound. Alternatively, the poly(butylene oxide) polyol can be mixed with an excess of polyisocyanate compounds and reacted to form the prepolymer/polyisocyanate compound mixture in one step. If the polyisocyanate component is to have both aliphatic and aromatic isocyanate groups, it is preferred to produce the prepolymer by mixing the poly(butylene oxide) polyol with some or all or the aromatic polyisocyanate(s), to form a prepolymer having aromatic isocyanate groups or a mixture of such a prepolymer with a portion of the starting aromatic polyisocyanate compound, and then blending the prepolymer or mixture with the aliphatic polyisocyanate(s).

The polyisocyanate component may contain up to 50% by weight of one or more particulate inorganic fillers as described before. In some embodiments, the polyisocyanate component contains at least 20% by weight of one or more such fillers, and may contain, for example, 20 to 50% or 30 to 40% by weight thereof. As before, in some embodiments, the filler excludes carbon particles.

The polyisocyanate component may also contain one or more other additional ingredients, such as those described above with respect to the polyisocyanate compound. As with the polyol component, the polyisocyanate component preferably contains no more than 0.5% by weight, more preferably no more than 0.1% by weight of organic compounds having a boiling temperature of 80° C. or less, and no more than 0.1% by weight, more preferably no more than 0.05% by weight, of water and/or other chemical blowing agents that produce a gas under the conditions of the curing reaction. The polyisocyanate compound preferably contains at most, amounts of plasticizers as described before with respect to the polyol component.

The polyol component and polyisocyanate component are formulated such that when equal volumes of the components are provided, the isocyanate index is 1.1 to 1.8. For purposes of this invention, "isocyanate index" is the ratio of the number of isocyanate groups in the polyisocyanate component to the number of isocyanate-reactive groups in the polyol component. For purposes of this calculation, a primary amino group is considered as a single isocyanate-reactive group, even though it has two amine hydrogen atoms. A preferred isocyanate index, at a 1:1 volume ratio, is 1.15 to 1.65.

The invention is also a process for bonding two substrates. In general, the polyol component and the isocyanate component are mixed to form a reaction mixture. The ratio of these materials is generally sufficient to provide an isocyanate index of 1.1 to 1.8, more preferably 1.15 to 165. The reaction mixture is formed into a layer between and in contact with the two substrates. An adhesion promoter may be applied to one or both of the substrates prior to contacting the substrate(s) with the adhesive. The adhesive layer is then cured between and in contact with the two substrates to form a layer of cured adhesive bonded to each of the two substrates.

The methods used to mix the isocyanate component with the polyol component, to form the adhesive layer and cure the adhesive are, broadly speaking, not critical and a variety of apparatus can be used to perform these steps. Thus, the isocyanate component and polyol component can be mixed manually, in various types of batch apparatus, and/or using various sorts of automated metering, mixing and dispensing equipment.

The polyol component and isocyanate component often will react spontaneously upon mixing at room temperature (about 22° C.) and cure without the need to heat the adhesive to a greater temperature. Therefore, in some embodiments, curing is effected by simply mixing the components at a temperature of, for example, 0 to 35° C. and allowing the components to react at that temperature.

Heating can be applied to the adhesive to obtain a more rapid cure. The polyol and isocyanate components can be heated separately and then mixed and cured, with or without further applied heat. Alternatively, the polyol and isocyanate components can be mixed at a lower temperature, such as 0 to 35° C. and then heated to a higher cure temperature. The substrate can be heated before applying the adhesive if desired. If an elevated temperature is used in the curing step, such a temperature may be, for example, 36 to 100° C., or 36 to 65° C.

In some embodiments, the adhesive is formulated to provide a latent cure, i.e., a prolonged "open time" during which the adhesive remains flowable and thus allows for manipulation of the adhesive itself and/or a substrate in contact with the adhesive. In some embodiments, the adhesive exhibits an open time of at least 15 minutes, preferably at least 20 minutes, when mixed and cured at room temperature. A simple test for measuring open time is to apply a bead of adhesive onto a room temperature substrate and then periodically compress the bead with a wooden spatula. The open time is the elapsed time between the time of application and that at which the adhesive no longer sticks to the spatula.

Latent curing properties can be obtained, for example, by including at least one latent catalyst as ingredient d) of the polyol component. For purposes of this invention, a latent catalyst is one which requires exposure to an elevated temperature of at least 40° C. to become catalytically active. Examples of such latent catalysts include, for example, dialkyl tin thioglycolates such as dioctyltinthioglcolate, dibutyltinthioglycolate and dimethyltinthioglycolate; and acid-blocked tertiary amine and/or cyclic amidine catalysts, in which the acid blocking group is, for example, a carboxylic acid such as a C1-C18 alkanoic acid, a benzoate or substituted benzoate and the like. Any of the tertiary amine and/or cyclic amidine catalysts described above can be acid-blocked in this manner to produce a latent catalyst. Specific examples include carboxylic acid-blocked triethylene diamine catalysts such as Niax™ 537 (Momentive Performance Products) and carboxylic acid-blocked 1,8-diazabicyclo[5.4.0]-undec-7-ene catalysts such as Toyocat DB41 (Tosoh Corporation) and Polycat SA-1/10 (Momentive Performance Products). In some embodiments, ingredient d) of the polyol component also includes at least one ambient temperature urethane catalyst in addition to the latent catalyst. An ambient temperature catalyst, for purposes of this invention, is a catalyst that is active at a temperature of below 30° C., preferably at 22° C., and thus does not require exposure to an elevated temperature to become catalytically active.

The substrates are not limited. They can be, for example, a metal, a metal alloy, an organic polymer, a lignocellulosic material such as wood, cardboard or paper, a ceramic material, various types of composites, or other materials. Carbon fiber reinforced plastic is a substrate of particular interest. The substrates in some embodiments are vehicular parts or vehicular sub-assemblies that are adhered together with a cured adhesive composition of the invention. The substrates in other embodiments are individual plies that are glued together using the adhesive of the invention to form a multilayer laminate. The substrates in other embodiments are building members.

The following examples are provided to illustrate the invention, but are not intended to limit the scope thereof. All parts and percentages are by weight unless otherwise indicated. In the following examples:

Polyol A is a nominally trifunctional ethylene oxide-capped poly(propylene oxide) having a molecular weight of about 4800 g/mol and a hydroxyl equivalent weight of about 1600.

Polyol B is a nominally difunctional poly(propylene oxide) having a molecular weight of about 1000 and a hydroxyl equivalent weight of about 500.

Polyol C is a nominally difunctional poly(propylene oxide) having a molecular weight of about 2000 and a hydroxyl equivalent weight of about 1000.

Polyol D is a nominally difunctional poly(propylene oxide) having a molecular weight of about 2000 and a hydroxyl equivalent weight of about 1000, which has a lower level of monofunctional impurities than Polyol C.

Polyol E is an approximately difunctional polyester polyol having a molecular weight of about 1000 and a hydroxyl equivalent weight of about 500.

BO Polyol A is a nominally difunctional poly(1,2-butylene oxide) having a molecular weight of about 2000 and a hydroxyl equivalent weight of about 1000.

BO Polyol B is a nominally difunctional poly(1,2-butylene oxide) having a molecular weight of about 4000 and a hydroxyl equivalent weight of about 2000.

Aminated Polyether A is a 440 g/mol, trifunctional poly(propylene oxide) terminated in primary amine groups, sold as Jeffamine™ T403 by Huntsman Corporation.

Aminated Polyether B is a 230 g/mol, difunctional poly(propylene oxide) terminated in primary amine groups, sold as Jeffamine™ D230 by Huntsman Corporation.

Polyisocyanate A is a "liquid MDI" product having an isocyanate functionality of about 2.2 and equivalent weight of about 143.

Polyisocyanate B is a polymeric MDI having an isocyanate functionality of about 2.7 and an isocyanate equivalent weight of about 139.

Polyisocyanate C is an aliphatic polyisocyanate based on hexamethylene diisocyanate product, having an isocyanate equivalent weight of 193.

The Catalyst Mixture is a mixture of dialkyltin mercaptide, 1,9-diazabicyclo[5.4.0]undec-7-ene and triethylene diamine catalysts.

EXAMPLES 1-2 AND COMPARATIVE SAMPLES A-E

Polyol Components used in Examples 1 and 2 and Comparative Samples A-D are made by mixing ingredients as indicated in Table 1:

TABLE 1

| | Parts by Weight | |
| --- | --- | --- |
| Ingredient | Ex. 1, 2, Comp. Samples A, C and D | Comp. Sample B |
| Polyol A | 53.51 | 53.51 |
| Aminated Polyether A | 0 | 0.6 |
| Aminated Polyether B | 0.6 | 0 |
| 1,2-propanediol | 0 | 1 |
| Monoethylene glycol | 5.2 | 4.2 |
| Catalyst Mixture | 0.52 | 0.52 |
| Calcined China Clay | 38.18 | 37.33 |
| Hydrophobically Modified Fumed Silica | 1.5 | 1.5 |
| Dispersing aid | 0.5 | 0.5 |
| Fluorinated surfactant | 0.05 | 0.05 |

The polyol components are prepared by mixing all the ingredients except the clay and fumed silica in a planetary mixing unit until homogeneous. The clay and fumed silica are then added slowly with mixing, and the resulting composition mixed an additional 40 to 50 minutes under a pressure of 100 atmospheres. The compounded polyol components are then transferred into cartridges.

Polyisocyanate Components are made from the ingredients listed in Table 2.

TABLE 2

| | Parts By Weight | | | | | |
| --- | --- | --- | --- | --- | --- | --- |
| Ingredient | Ex. 1 | Ex. 2 | Comp. Sample A | Comp. Sample B | Comp. Sample C | Comp. Sample D |
| Calcined China Clay | 40 | 39 | 40 | 40 | 37.3 | 37.3 |
| Hydrophobically Modified Fumed Silica | 1 | 1 | 1 | 1 | 1 | 1 |
| Polyisocyanate A | 8 | 8 | 8 | 8 | 10.5 | 10.5 |
| Polyisocyanate B | 25.5 | 24 | 25.5 | 25.5 | 27 | 27 |
| Polyisocyanate C | 6 | 6 | 6 | 6 | 5 | 5 |
| Polyol B | 0 | 0 | 0 | 0 | 19.2 | 0 |
| Polyol C | 0 | 0 | 19.5 | 0 | 0 | 0 |
| Polyol D | 0 | 0 | 0 | 19.5 | 0 | 0 |
| Polyol E | 0 | 0 | 0 | 0 | 0 | 19.5 |
| BO Polyol A | 19.5 | 0 | 0 | 0 | 0 | 0 |
| BO Polyol B | 0 | 22 | 0 | 0 | 0 | 0 |

Each of the Polyisocyanate Components are made by mixing the polyol (if any), the BO Polyol and the aromatic polyisocyanate(s) in a planetary mixture under ambient temperature and pressure until a homogeneous mixture is obtained. The clay and fumed silica are then added slowly. Mixing is continued for 40 to 50 minutes under a pressure of 100 atmospheres and ambient temperature, after which the temperature is increased to 75° C. and mixing is continued for an additional 60 minutes. After cooling the mixture to 40° C., it is filled into cartridges.

To produce cured adhesives for physical property testing, equal volumes of the respective polyol and polyisocyanate components are mixed to produce a mixture in which the isocyanate index is 1.15-1.65. The mixture is formed into a 2-mm thick layer and cured for 7 days at 23° C. and 50% relative humidity. For each experiment, duplicate test specimens are cut for physical property testing. Physical property testing is performed on a portion of the specimens. The remaining specimens are wrapped in cotton. The wrapped samples are saturated with water and then wrapped in aluminum foil and polyethylene film to prevent water from escaping. The wrapped sample is exposed to 70° C. for 7 days, and then cooled to −20° C. for 16 hours. The sample is then brought to ambient temperature and stored at 23° C. for 2 hours before performing physical property testing.

In each case, Young's modulus, tensile strength and elongation are measured on the samples as aged at 23° C./7 days, and again after the humid aging regimen. Results are as indicated in Table 3. In Table 3, Comp. Sample E is a commercially available two-part polyurethane adhesive that represents a baseline case.

tive Sample B is made using Polyol D, which has a low monol content, similar to that of BO Polyol A. As seen in Table 3, the change from Polyol C to Polyol D (Comp. Sample A vs. Comp. Sample B), results in little change in modulus, tensile strength or elongation before humid aging. Like Comparative Sample A, Comparative Sample B exhibits a large decrease in modulus and a significant increase in elongation after humid aging. These results suggest that the better performance of Example 1 is attributable to the selection of a poly(butylene oxide) polyol, rather than being merely an effect of a reduced monol content.

Comparative Samples C and D show the effect of replacing Polyol C with lower equivalent weight polyols. In each case, the modulus before humid aging is much lower than Example 1. Like Comparative Samples A and B, Comparative Sample C exhibits a large loss in modulus and a significant increase in elongation when humid aged, contrary to Example 1. Comparative Sample D shows a very large increase in elongation and tensile strength when humid aged.

Comparative Sample E is a commercial benchmark. It has a very low modulus and tensile strength, and much higher elongation, before humid aging. Upon humid aging, it exhibits a large decrease in modulus and tensile strength and a large increase in elongation.

TABLE 3

| Property | Sample Designation | | | | | | |
|---|---|---|---|---|---|---|---|
| | Ex. 1 | Ex. 2 | Comp. Sample A | Comp. Sample B | Comp. Sample C | Comp. Sample D | Comp. Sample E |
| Young's modulus (MPa) | | | | | | | |
| Before humid aging | 158 | 156 | 135 | 131 | 73 | 125 | 23 |
| After humid aging | 147 | 157 | 86 | 107 | 60 | 114 | 15 |
| Change (%) | −7 | 1 | −36 | −18 | −18 | −9 | −35 |
| Tensile Strength (MPa) | | | | | | | |
| Before humid aging | 16.7 | 17.1 | 13.5 | 14.3 | 17.2 | 15.3 | 11 |
| After humid aging | 13.7 | 13.7 | 11.7 | 12.2 | 11.2 | 9.9 | 8 |
| Change (%) | −18 | −23 | −13 | −15 | −35 | −34 | −27 |
| Elongation (%) | | | | | | | |
| Before humid aging | 60 | 64 | 55 | 66 | 70 | 67 | 190 |
| After humid aging | 50 | 62 | 64 | 73 | 84 | 93 | 318 |
| Change (%) | −17 | −3 | +16 | +11 | +20 | +39 | +40 |

Example 1 and Comparative Sample A are direct comparisons, their formulations being identical except for the substitution of BO Polyol A for the poly(propylene oxide) diol in Comparative Sample A. As can be seen from the foregoing data, before humid aging, Example 1 has a much higher Young's modulus than Comp. Sample A (158 MPa vs. 135 MPa), and a much higher tensile strength (16.7 MPa vs. 13.5 MPa). Elongations are similar.

Example 1 and Comparative Sample A show greatly different behavior after humid aging. Comparative Sample A exhibits a large decrease in modulus and an increase in elongation, indicating that significant water absorption occurs during humid aging. In contrast, Example 1 shows little change in modulus and a decrease in elongation after humid aging. The Example 1 humid aging results indicate that little if any water absorption has occurred.

Polymers of propylene oxide such as Polyol C (used in Comparative Sample A) are known to contain significant amounts of monol impurities, whereas poly(butylene oxides) tend to contain much lower monol levels. To compensate for the potential effect of monol content, Compara- Example 2 performs similarly to Example 1, despite the higher equivalent weight of the poly(butylene oxide) polyols used in Example 2. Initial modulus is much higher than any of the comparatives, and is essentially unchanged after humid aging. Elongation also is essentially unaffected by humid aging.

What is claimed is:

1. A two-component polyurethane adhesive composition having a polyol component and an isocyanate component, wherein:
   the polyol component includes:
   a) at least 35 weight percent, based on the weight of the polyol component, of one or more polyether polyols having a hydroxyl equivalent weight of 400 to 2000 and a nominal hydroxyl functionality of 2 to 4, which polyether polyols(s) are selected from homopolymers of propylene oxide and copolymers of 70 to 99% by weight propylene oxide and correspondingly 1 to 30% by weight ethylene oxide;
   b) 5 to 20 parts by weight, per 100 parts by weight of ingredient a) of the polyol component, of one or more diol chain extenders;

c) 0.1 to 3 parts by weight, per 100 parts by weight of ingredient a) of the polyol component, of at least one compound having at least two primary and/or secondary aliphatic amine groups;
d) a catalytically effective amount of at least one urethane catalyst; and
e) up to 60 weight percent, based on the weight of the polyol component, of at least one particulate filler;
and the polyisocyanate component includes:
15 to 60 weight percent, based on the weight of the polyisocyanate component, of at least one isocyanate-terminated poly(butylene oxide) prepolymer having at least 2 isocyanate groups per molecule and an isocyanate equivalent weight of 700 to 3500, a poly(butylene oxide) segment having a weight of 1000 to 6000 g/mol;
20 to 50 weight percent, based on the weight of the polyisocyanate component, of at least one polyisocyanate compound having an isocyanate equivalent weight of up to 350 and 2 to 4 isocyanate groups per molecule; and
up to 50% by weight of at least one particulate filler;
wherein the isocyanate equivalent weight of the polyisocyanate component and the equivalent weight per isocyanate-reactive group of the polyol component are such that when the polyisocyanate component and the polyol component are mixed at a 1:1 ratio by volume the isocyanate index is 1.1 to 1.8.

2. The adhesive composition of claim 1, wherein the prepolymer is a reaction product of an aromatic polyisocyanate and a poly(butylene oxide) polyol.

3. The adhesive composition of claim 2, wherein the polyisocyanate component contains aliphatic and aromatic isocyanate groups.

4. The adhesive composition of claim 3 wherein the polyisocyanate compound having an isocyanate equivalent weight of up to 350 is a mixture of at least one aromatic polyisocyanate and at least one aliphatic polyisocyanate.

5. The adhesive composition of claim 4 wherein the poly(butylene oxide) segment has a weight of 1800 to 4200 g/mol.

6. A cured adhesive formed by curing the two-component polyurethane adhesive composition of claim 1.

7. A method of bonding two substrates, comprising forming a layer of the two-component polyurethane adhesive of claim 1 at a bondline between two substrates, and curing the layer at the bondline to form a cured adhesive bonded to each of the substrates.

* * * * *